United States Patent [19]

Schild

[11] 3,858,235

[45] Dec. 31, 1974

[54] PLANAR FOUR-LAYER-DIODE HAVING A LATERAL ARRANGEMENT OF ONE OF TWO PARTIAL TRANSISTORS

[75] Inventor: Juergen Schild, Ebersberg, Germany

[73] Assignee: Siemens Aktiengesellschaft, Berlin & Munich, Germany

[22] Filed: Sept. 17, 1973

[21] Appl. No.: 397,712

Related U.S. Application Data

[63] Continuation of Ser. No. 267,425, June 29, 1972, abandoned.

[30] Foreign Application Priority Data

July 5, 1971 Germany............................ 2133430

[52] U.S. Cl......................... 357/35, 357/38, 357/52, 357/53

[51] Int. Cl............................. H01l 3/00, H01l 5/00

[58] Field of Search...... 317/235, 40.12, 41.1, 46.1, 317/234 N

[56] References Cited

UNITED STATES PATENTS

| | | | |
|---|---|---|---|
| 3,391,287 | 7/1968 | Kao et al. | 317/235 R |
| 3,405,329 | 10/1968 | Loro et al. | 317/235 R |
| 3,601,668 | 8/1971 | Siaten | 317/234 R |
| 3,763,406 | 10/1973 | Bosselaar | 317/235 R |

*Primary Examiner*—Andrew J. James
*Attorney, Agent, or Firm*—Hill, Gross, Simpson, Van Santen, Steadman, Chiara & Simpson

[57] ABSTRACT

A bidirectional diode of the planar four-layer type which is formed by a lateral arrangement of one of two partial transistors and by a metal electrode arranged on an insulating layer which overlies the base of this lateral partial transistor, and which metal electrode is connected to the base of this lateral partial transistor for the purpose of decreasing inverse current as well as for the purpose of increasing the circuit voltage and the holding current. The metal electrode may be connected to the base through an opening in the insulating layer to a high impurity region in the base or it may be connecting externally to the base contact on the opposite side of the substrate from the side where the anode contact and cathode contact are located.

6 Claims, 6 Drawing Figures

PLANAR FOUR-LAYER-DIODE HAVING A LATERAL ARRANGEMENT OF ONE OF TWO PARTIAL TRANSISTORS

This is a continuation, of application Ser. No. 267,425, filed June 29, 1972 and now abandoned.

BRIEF SUMMARY OF INVENTION

The present invention is directed particularly to a novel improvement in a planar four-layer-diode wherein an additional metal electrode is provided which overlies an insulating layer formed over the base of the lateral transistor of the four-layer-diode and which metal electrode is electrically connected to this base. The connection may be made either through a window in the insulating layer and then through a high impurity diffused region of the same impurity type as the base, or may be made through an external electric circuit connection to a base electrode located on the opposite side of the base from the first mentioned metal electrode.

Another feature of the present invention is to provide a planar four-layer-diode of the above type in which the metal electrode either extends laterally as far as the pn junctions, or extends to points short of the pn junctions but corresponding to the location of the lateral outer facing boundaries of the space charge regions.

FIELD OF INVENTION AND PRIOR ART

Figure 1:
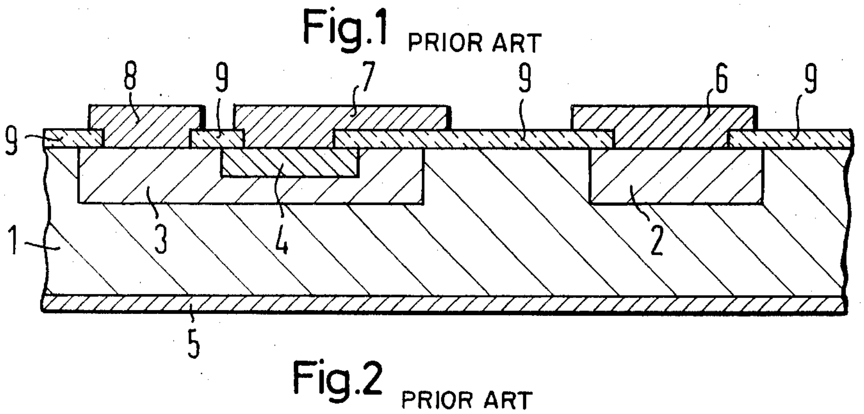
Fig.1 PRIOR ART
FIG. 1 is a partial sectional view of a four-layer-diode of a type already known.
Figure 2:
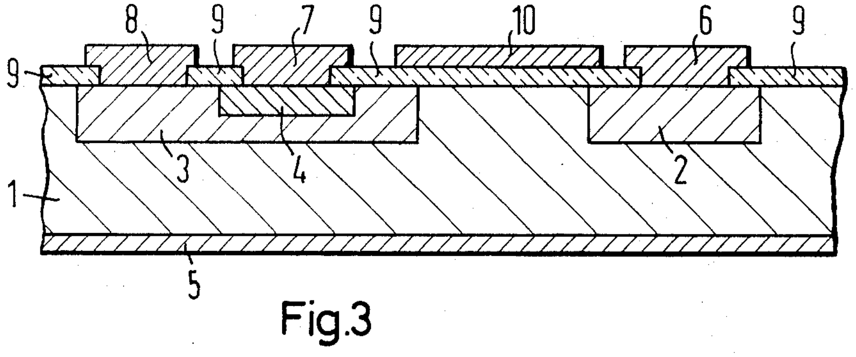
Fig.2 PRIOR ART
FIG. 2 is a fragmentary partial sectional view of another prior art form of a planar four-layer-diode.

In order to more fully understand the present invention, reference will first be made to two different forms of prior art devices as illustrated in FIGS. 1 and 2. The prior art device shown in FIG. 1 comprises a semiconductor substrate 1 of one impurity type, for example, n-type by a diffusion technique. Two regions 2 and 3 of opposite impurity type are diffused into the upper surface of the substrate 1. By a further diffusion step an additional zone 4 of the first impurity type is diffused into the upper portion of part of the zone 3. Where the substrate is of n-type impurity, zones 2 and 3 are of a p-type impurity and zone 4 is of an n-type impurity. An insulating layer 9 is formed on the upper surface of the substrate 1 and may, for example, be silicon dioxide when the substrate is of silicon. Windows are formed in the insulating layer 9 over a central portion of zone 2, over the central portion of zone 4 and over a portion of zone 3. Electrodes 6, 7 and 8 are formed on the insulating layer 9 and extend through the windows overlying zones 2, 4 and 3 so that they are in direct contact with these zones. The electrodes 6, 7 and 8 have their marginal portions formed to overlie a part of the adjacent insulating layer 9. A metal contact 5 is formed on the undersurface of the substrate 1.

This device, so described, is a planar four-layer-diode formed by a lateral arrangement of one of the partial transistors of the above structure and has a metal electrode which is arranged on the insulating layer above the base of the lateral transistor. This four-layer-diode includes an anode formed by zone 2 and its associated contact 6. It also includes an anode grid formed by zone 1 with its associated contact 5. The cathode is formed by zone 4 with its associated contact 7 and the cathode grid is formed by zone 3 with its associated contact 8.

From the above description it will be apparent that this four-layer-diode can be regarded as comprising two transistors, one of which is formed as a vertical transistor with zones 4, 3 and 1 and the other of which is formed as a lateral transistor with zones 3, 1 and 2.

During operation of the above-described diode as illustrated in FIG. 1, a voltage appears between the anode 2 and the cathode 4, whereby the turn-on point can be controlled by a grid 3 or a grid 1 by means of control voltages. Depending upon the polarity of the voltage between the anode and cathode, either the pn junction between zone 1 and zone 2 or the pn junction between zone 1 and zone 3 is in the blocked condition. When operating under the influence of voltage and temperature, these diodes tend to be unstable, which leads to an inverse current increase as well as to a decrease of the bias reducing potential (unblocked potential) and the holding current. Instabilities of this type are the result of channel formations at the surface of the middle zone of base 1 of the lateral transistor 3, 1, 2.

Attempts have been made to stabilize four-layer-diodes of the above referred to type by causing the contact 6 and 7 to reach into the pn junctions which limit the middle zone 1. This, however, only resulted in improving the stability in a polarity of the voltage lying between anode 2 and cathode 4 but had only a negative effect with inversed polarity of the applied voltage. Other attempts have been made to improve the stability in devices of this general type by providing an arrangement as shown in FIG. 2. Here to improve the stability a metal electrode is formed over the middle zone 1, which middle zone 1 forms the base of the lateral transistor. More particularly, the metal electrode extends far enough on either side so as to cover the adjacent pn junctions. Here the metal electrode which is so formed is identified as 10. This arrangement has been found in the past not to improve the stability. If the potential of the electrode 10 in FIG. 2 is maintained such as by connecting it to one of the other electrodes, the same effect is achieved by providing the electrodes 6 and 7 with overlapping portions as shown in FIG. 1 where it is noted that the overlapping portions of 6 and 7 do overlie the pn junctions between zones 2 and middle zone 1 and zone 3 and middle zone 1. If, on the other hand, the potential of electrode 10 is left open, there will be a decrease in the inverse current between anode 2 and cathode 4, with low voltages. However, with high voltages, there will be a premature breakthrough.

DETAILED DESCRIPTION OF THE INVENTION

The present invention is a novel improvement over the prior art forms described above. More specifically, the present invention provides a novel structure with improved blocking characteristics and with improved stability characteristics. The problem is solved by the present invention by having the metal electrode which overlies the insulating layer above the middle zone 1 conductively connected to the base of the lateral partial transistor.

Figure 3:
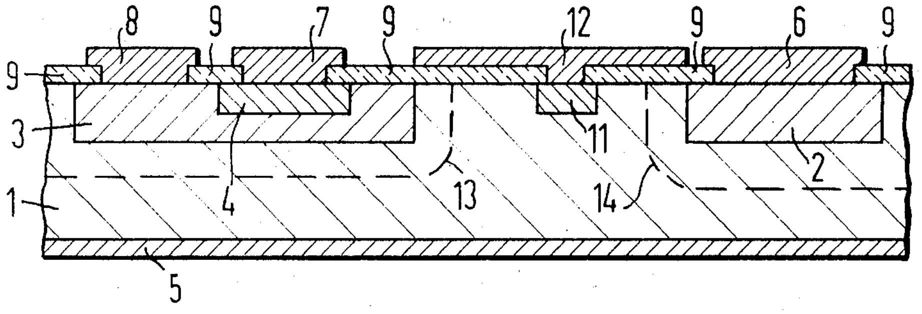
FIG. 3 is a fragmentary sectional view of a planar four-layer-diode embodying the present invention.

The preferred form of the present invention is diagrammatically illustrated in FIG. 3 where a four-layer-diode with a metal electrode embodying the novel teachings of the present invention is shown. Elements and regions which coincide with FIGS. 1 and 2 have been given the same numerical designations. The structure as shown and described in FIG. 2 is found in the novel structure of FIG. 3 with certain important differences. As shown in FIG. 3, a metal electrode 12 extends through an opening in the insulation layer 9 into contact with a zone 11 of high impurity concentration, the zone 11 being formed as a high impurity concentration region in base region 1 of the lateral transistor. For reasons well recognized, space charge regions 13 and 14 will be formed when the device is in operation as indicated by the broken lines 13 and 14.

Figure 5:
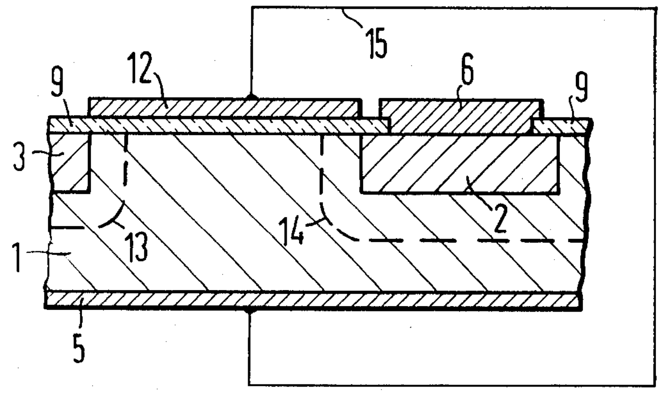
FIG. 5 is a partial fragmentary sectional view of a planar four-layer-diode embodying a modified form of the present invention in which the metal electrode overlying the base is connected externally to the base electrode.

A modified connection of the metal electrode 12 with the middle base zone 1 may be made externally as diagrammatically shown in FIG. 5.

Figure 6:
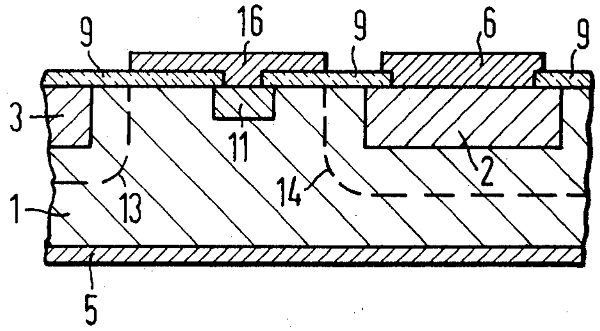
FIG. 6 is a fragmentary partial sectional view of a planar four-layer-diode embodying a further modification of the present invention similar to that shown in FIG. 3, but in which the metal electrode does not extend across the insulating layer to the pn junctions at opposite edges thereof.

The metal electrode 12 overlies the insulating layer 9 which is formed over the substrate 1 in the region above the middle zone between the two pn junctions (as shown in FIG. 3) or it may extend laterally (as shown in FIG. 6) only as far as the boundaries of the space charge zones 13 and 14 of the pn junctions.

Figure 4:
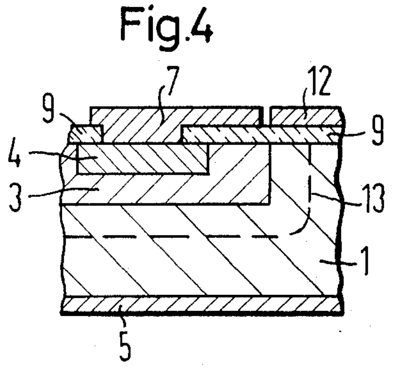
FIG. 4 is a fragmentary sectional view of a portion of a planar four-layer-diode embodying a modified form of the present invention.

As shown in FIG. 4, the cathode contact 7 may be enlarged so as to overlie the insulating layer 9 to a point just short of the pn junction between the middle zone of substrate 1 and the cathode grid zone 3. It has been found that this further improves the stability of the device.

I claim as my invention:

1. A planar four-layer-diode having a lateral arrangement of first and second regions forming a partial transistor which includes a substrate of one conductivity type and laterally spaced first and second regions of opposite conductivity type forming pn junctions with said substrate, an insulating layer above said substrate, a metal electrode formed on said insulating layer above that portion of said substrate between the pn junctions only of said lateral partial transistor, and metal electrode being conductively connected with said substrate.

2. A planar four-layer-diode comprising a chip having a substrate of one impurity type having first and second impurity zones formed in said substrate of an opposite impurity type to said substrate, a portion of said substrate lying between said first and second impurity zones, a third impurity zone formed in said first impurity zone of the same impurity type as said substrate, a layer of insulating material formed on the upper surface of said chip overlying said first, second and third zones, and said portion of said substrate, first, second and third electrodes formed on said insulating layer and extending through said insulating layer into contact with said first, second and third zones, respectively, a fourth electrode overlying the undersurface of said substrate and in contact therewith, a fifth metal electrode overlying said insulating layer only above that said portion of said substrate which lies between said first and second impurity zones, and said fifth metal electrode being electrically connected to said substrate.

3. A diode according to claim 2, in which said fifth electrode extends laterally only as far as the space charge zones which are located adjacent the pn junctions between said portion of said substrate which lies between said first and second impurity zones.

4. A planar four-layer-diode comprising a semiconductor substrate of one conductivity type, first and second regions of the opposite conductivity type in one surface thereof, the portion of said substrate lying between said first and second regions forming a third region which in conjunction with said first and second regions constitutes a partial lateral transistor, a fourth region of said one conductivity type in the surface of said first region; said fourth region, said first region, and said substrate forming a second partial transistor, an insulating layer on said substrate above said regions, a first, second and fourth metal electrode formed on said insulating layer above said first, second and fourth regions, said insulating layer having windows therethrough through which said first, second and fourth metal electrodes extend into contact with their associated regions, a third metal electrode on said insulating layer above said third region and only extending over the region which lies between the pn junctions of said first partial transistor, said third metal electrode being electrically connected to said substrate.

5. A planar four-layer-diode as set forth in claim 4, in which said electrical connection between said third electrode to said substrate is external of the substrate.

6. A planar four-layer-diode as set forth in claim 4 in which said third region has additional regions of the same impurity type and of high impurity concentration in the upper surface thereof, said insulating layer having a window therethrough below said third electrode through which said third electrode extends into contact with said additional region.

* * * * *